Sept. 4, 1962    J. M. BRADLEY    3,051,992
CONTINUOUS CURING OF POLYMERIC MATERIALS
Filed May 20, 1960
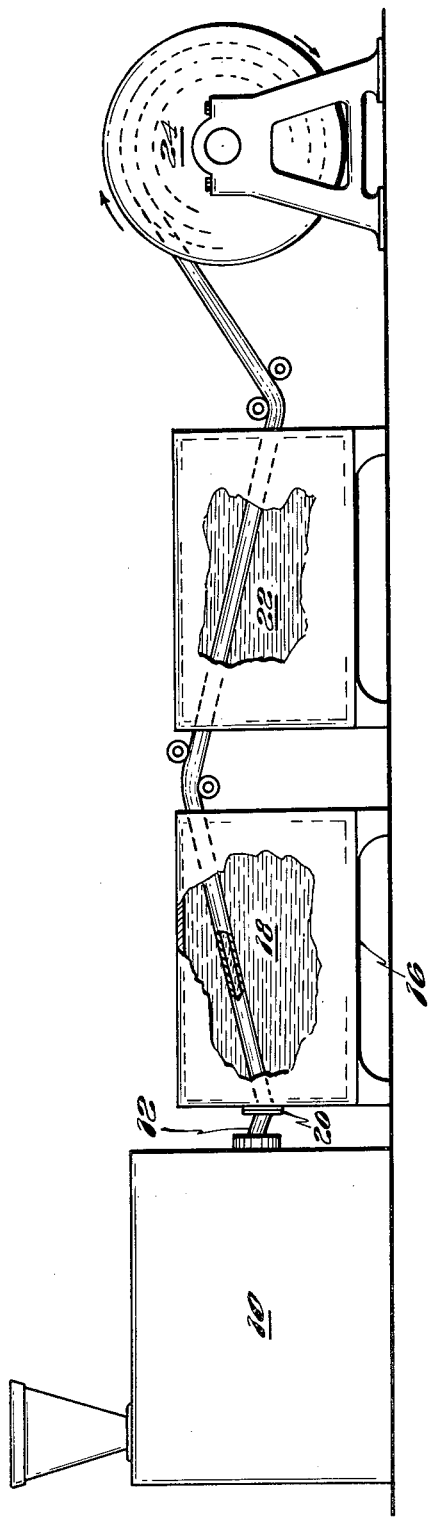
JOHN M. BRADLEY
Inventor
by Kenneth W. Brown, Atty.

United States Patent Office
3,051,992
Patented Sept. 4, 1962

3,051,992
CONTINUOUS CURING OF POLYMERIC MATERIALS
John M. Bradley, Manchester, Mass., assignor to Cabot Corporation, Boston, Mass., a corporation of Delaware
Filed May 20, 1960, Ser. No. 30,586
4 Claims. (Cl. 18—53)

This invention relates to a process for continuously curing shaped polymeric materials. Specifically, it relates to a new process for continuously curing heat-curable polymeric compositions while in the ultimate or final cross-sectional shape desired.

A process for the continuous curing of heat-curable extruded polymeric compositions is one of considerable commercial importance. Today there are many such processes. One of the fundamental problems involved in all such processes is that the major portion of the curing of such polymeric compositions must be effected while the extrudate is maintained in the final shape desired. If the extrudate of the polymeric composition is cured more than slightly while in a distorted or undesired shape, then the finished plastic article (even if frozen in a different shape initially) will still, when subjected to increased temperatures, revert back to that shape at which the major portion of the total cure was effected. It is therefore, fundamental to any process for the curing of a polymeric composition that the process provide that the major amount of the curing of the said polymeric composition be carried out while the extrudate is maintained in the ultimate shape desired. This problem of curing the extrudate at the final desired form becomes especially complicated when the extrudate must be cured at a temperature above the no-strength or melting temperature of the extruded polymeric composition. The complication is further compounded when the extrudate being cured is an article of non-internally supported, generally tubular cross-section such as tubing, pipe or conduit.

The most effective process to date for solving the aforementioned problems is that process which effects the curing of the extrudate by imposing a high frequency alternating electric field of proper intensity across a passage which is designed so as to support the flowing extrudate in the desired finished shape. This method, however, involves the use of expensive equipment and when the major amount of the total cure is thus carried out, is not without such attendant difficulties as sticking, scorching, and uneven and premature curing.

Another process involves the extrusion of the polymeric composition and the subsequent curing of the extrudate in a liquid heat transfer medium. Curing of an extrudate in a liquid heat transfer medium has such advantages as simplicity of operation, low cost, fast cure, and the minimization of surface oxidation of the extrudate. However, such a process is considered impractical when the extrudate is intended to be cured to a form stable hollow tubular article or when the extrudate is a material which can only be cured at temperatures above its no-strength or melting temperature. The above-mentioned cured extrudates produced by such a method have been consistently found to exhibit the aforementioned distortion which is generally conceded to be inherent in the use of such a curing process. In order to overcome this difficulty, various complicated and expensive supporting devices have been developed and employed for the purpose of holding the extrudate in a rigid form for a period of time in which the said extrudates are sufficiently cured so that they are able to maintain temporarily the desired form for a sufficient period of time to complete the cure at the high curing temperature required. The finished products produced by those processes which utilize such devices, however, have been found to contain flaws, surface defects, and areas of inadequate strength and integrity. These undesirable properties merely reflect some of the inherent difficulties in the use of such devices.

The principal object of this invention is to provide an improved process for curing polymeric compositions to thoroughly cured yet smooth surfaced, distortion free, form stable plastic articles of the desired symmetrical cross-sectional shape, particularly tubular shapes.

Another object of this invention is to provide a process which is particularly advantageous for continuously curing heat-curable polymeric compositions which can be extruded at temperatures below their active curing temperature which in turn is actually above the no-strength or melting temperature of the resin component thereof to yield thoroughly cured yet smooth surfaced, distortion free, form stable tubular and hollow tubular plastic articles.

Other objects accomplished by the process of this invention are to provide a simple method for curing plastic compositions which obviates the use of complicated and costly equipment and does not unduly restrict production rate of the associated extrusion equipment.

Other objects of this invention will in part be obvious and will in part appear hereinafter.

The above objects and advantages are realized in accordance with the present invention by flowing a heat-curable polymeric composition heated to a temperature at which it is readily shapable and flowable but below its active curing temperature, through a passage of the final desired shape and cross-section and immediately passing the said shaped extrudate into a curing bath containing a heat transfer liquid at the required curing temperature, the specific gravity of said liquid at said temperature being substantially equal to the specific gravity of the extrudate at the time the extrudate enters the curing bath. In this manner a polymeric composition may be thoroughly and continuously cured to a form-stable, plastic article free of distortion and having the desired symmetrical cross-sectional area. Apparently the success achieved by this unique feature of my invention is due to the elimination of the unequal gravitational and buoyant forces normally introduced between the heat transfer medium and the extrudate with liquid baths heretofore employed.

In addition to the liquid heat transfer medium having a specific gravity at the curing temperature substantially equal to the specific gravity of the extrudate at the time the extrudate enters the curing bath, two other specifications are required of the medium selected for this process. These specifications are: (1) That the liquid heat transfer medium must be substantially inert toward the extrudate at the time the extrudate enters the curing bath, (2), that the liquid heat transfer medium must have an atmospheric boiling point which is above that temperature at which the cure is to be effected. The range of curing temperature of those polymeric compositions considered within the scope of this invention is between about 300° F. to 600° F. and more particularly between 350° F. to 500° F. Such required properties of the selected heat transfer medium although restrictive, nevertheless provide sufficient latitude so that, in any given case, many choices are usually available from among the several general types of liquid heat transfer mediums available. Such general types of liquid heat transfer mediums are those consisting of lower melting metals or alloys, or combinations thereof; higher boiling, organic fluids, or mixtures of same; lower melting salts, or combinations thereof; and higher boiling aqueous and/or non-aqueous solutions of salts or combinations thereof.

Particular liquid heat transfer media consisting of metal alloys which conform to the required specifications are those of such low melting, low density metals as potassium, sodium, lithium and magnesium in various combinations alone or together with such heavier metals as mercury, bismuth and/or lead. It is obvious that the amounts of such metals in such combinations may be adjusted so that the boiling point and the specific gravity of the liquid heat transfer medium conforms to the specifications required by the particular extrudate. Heat transfer media of metal alloys are particularly adaptable to the curing of polymeric compositions which are used as a coating for a wire or other material where the specific gravity of such an extrudate is higher than that of an unsupported polymeric composition. Usually the uncured surfaces of the extrudate are coated with talc or some other such material prior to the curing in the molten metal.

Organic fluids if they are substantially inert towards the extrudate, are readily adaptable as heat transfer media for this process. This class affords a wide selection of organic fluids or combinations thereof which will conform or may be so adjusted as to conform to the required specifications of the particular extrudate being cured. Another advantage of this particular class is that many such fluids or combinations thereof are miscible in water and adhering traces of the fluid on the cured article may be easily removed by washing e.g. in the cold water cooling bath which generally follows the curing bath. Other organic fluids may be removed by washing the cured article in a detergent solution. Particular organic fluids and combinations thereof which conform to the aforementioned specifications are glycerol, and esters thereof; propylene glycol, and esters thereof; polyalkylene glycol derivatives, either water soluble or water insoluble, having viscosity ranges from 50 to between 60,000 and 90,000 Saybolt Universal Seconds at 100° F. such as Union Carbide's UCON fluids; and higher organic silicates such as tetra (2-ethyl butyl) silicate and tetra (2-ethyl hexyl) silicate.

Liquid heat transfer mediums consisting of molten salts which conform to the aforementioned specifications may be used in this process. In particular a heat transfer salt composed of sodium nitrite, sodium nitrate and potassium nitrate may be used.

Various aqueous and/or non-aqueous salt solutions and combinations thereof may also be selected to satisfy the aforementioned specifications. Such solutions are aqueous, partly aqueous, and non-aqueous solution of sodium chloride, potassium chloride, sodium nitrate, sodium nitrite, and potassium nitrate.

The extrudates considered within the scope of this invention are those polymeric compositions containing a thermoplastic resin or mixtures of diverse thermoplastic resins and a curing agent and those polymeric compositions containing thermpoplastic resin, filler, and curing agent. Some of the fillers utilized in such polymeric compositions are the various carbon blacks, silicas, clays and other inorganic fillers. The only restriction placed upon such fillers is that they be finely divided and not interfere wtih the efficiency of the curing agent. The specific gravity of the extrudate of the above-mentioned polymeric compositions will of course, be a function of the sepecific gravity of both the thermoplastic resin component and the filler component, if any, and the proportions of each and the curing temperature of the resulting composition.

The process described in this invention is a simple and economical process for the rapid and continuous production of thoroughly cured yet smooth surfaced, distortion free, form stable, plastic articles. The features and characteristics of my invention will be best understood and appreciated from the following description of a preferred manner of carrying out my novel process, in connection with the accompanying drawing which illustrates diagrammatically an arrangement of apparatus satisfactory for carrying out the process of my invention.

The FIGURE of the drawing is a largely schematic view in elevation of the apparatus used.

The illustrated apparatus comprises a more or less conventional extruder 10 which is satisfactory for forming and extruding the polymer composition in the approximate final desired shape. The aforementioned forming and extruding of the polymeric composition is conducted at a temperature below the active curing temperature thereof. The resulting extrudate 12 is then coated, if necessary, in a precoater (not shown). The precoater is necessary only if the extrudate is to be cured in a molten metal bath. The extrudate then immediately passes into a curing bath 16 which contains a heated liquid heat transfer medium 18 which conforms to the aforementioned specifications required by the particular extrudate being cured. At that point of the curing bath where the extrudate enters, there is located a sizing ring 20 which shapes the extrudate to the exact ultimate symmetrical cross-section shape desired. The length of travel of the extrudate 12 from the extruder 10 to the curing bath 16 is preferably as short as possible in order to minimize heat loss and other extra complications. If the extrudate 12 is solid, then the path of travel of said solid extrudate 12 through the curing bath can be essentially horizontal. If the extrudate 12 is hollow and if the mandrel used in forming the hollow extrudate is not electrically neutral then the path of travel of said hollow extrudate from the extruder 10 to the curing bath 16 should be (as shown in the drawing) inclined downwards, while the subsequent path of travel of said hollow extrudate after entering the bath is inclined upwards. In this way the hollow extrudate collects and maintains a column of the heated liquid heat transfer medium while each and every portion of the extrudate travels through the curing bath. If the mandrel used in forming the hollow extrudate is electrically neutral then the path of travel of the extrudate 12 from the extruder 10 to the curing bath 16 need not be downwards from the extruder 10. If desired the cured extrudate then passes through bath 22 containing a cold liquid such as water or a detergent solution in order to cool and wash or rinse off any remaining heat transfer liquid. The final product of the process is then continuously removed and stored on a wind up or take off 24.

It is obvious that various modifications of the above procedure may be introduced without interfering with the essence of my invention. For example, the curing bath may be inclined from the horizontal at any angle from 0° to 90°. For some purposes a vertical bath may be preferred in which case the extrudate may be extruded either upwardly or downwardly from the extruder to the vertical bath. The extrusion of a hollow extrudate upwardly into a vertical curing bath is especially convenient when the mandrel used in forming the hollow extrudate is electrically neutral and can therefore function as an internal plug for the heat transfer media within the hollow extrudate. Also my process may be used in combination with other curing processes as a supplementary curing process. This is especially true when my process is used in combination with the process described in U.S. Patent 2,972,780 to Boonstra. In such a combination the extruded polymetric composition is partially cured by dielectric curing to such an extent that the extrudate maintains some form and then the extrudate is sized at its entrance to the curing bath to the desired cross-sectional area and the major portion of the cure of the extrudate is effected by my process.

My process is illustrated more completely by the following specific examples:

*Example 1*

Into 100 parts of a copolymer of ethylene, butene-1 comprising about 5% by weight of butene-1, there were thoroughly milled about 30 parts by weight of carbon black and about 2 parts by weight of dicumyl peroxide. Some care was observed not to conduct this milling and dispersion operation at an excessively high speed so as to limit the temperature of the entire batch during the milling operation to a level below about 260° F., i.e. well below the active decomposition temperature of the dicumyl peroxide. The resulting finished composition was then charged to an extruder. The temperature of the body of the extruder and of the material therein was maintained at about 250° F. The aforementioned composition was then formed and extruded in the shape of a tube of 1″ O.D. and ¾″ I.D., which emerged at a temperature of about 270° F. The resulting extruded tubing was then immediately passed through a sizing ring located at the entrance of a curing bath and then into a bath which contained UCON heat transfer fluid (LB 200–x) maintained at about 400° F. UCON (LB 300–x) is the trade name for a water soluble polyalkylene glycol derivative sold by Union Carbide as a heat transfer fluid. At the time of the tubing's entrance into the bath media the tubing had a specific gravity of about 0.86, while the liquid heat transfer medium in the curing bath and a specific gravity of about 0.86, as determined by a hygrometer.

The cured tubing upon leaving the curing bath passed through a bath containing cold water and was then continuously removed and stored on a wind up or take off reel.

The resulting tube was examined and found to be thoroughly cured yet smooth surfaced and form stable. Portions of the tubing were placed in an oven heated to 200° F. and upon examination after 8 hours were found to be free of any cross-sectional and lengthwise distortion.

*Example 2*

Into 100 parts of low density polyethylene (0.92 density) there were thoroughly milled 120 parts by weight of carbon black and about 2 parts by weight of dicumyl peroxide. Some care was observed not to conduct this milling and dispersing operation at an excessively high speed so as to limit the temperature of the entire milling operation to a level below 260° F. i.e. well below the active decomposition temperature of the dicumyl peroxide. The resulting finished composition was then charged to an extruder. The temperature of the body of the extruder and of the material therein was maintained at about 250° F. The aforementioned material was then formed and extruded on a copper wire. The resulting coated wire was passed through a precoater and then immediately passed through a sizing ring located at the entrance of a curing bath and then into a bath containing as a heat transfer medium a molten metal alloy comprising about 77% mercury and about 23% potassium by weight. At the time of the coated wire's entrance into the bath media it had an average specific gravity of about 2.90 i.e. about the same as that of the mercury and potassium alloy at the curing temperature of about 400° F. The coated wire upon leaving the curing bath was cooled and continuously removed and stored on a wind up or take off reel.

The coated wire was examined and found to be a thoroughly cured yet smooth surfaced, form stable supported plastic article. Portions of the extrudate were placed in an oven heated to 200° F. and upon examination after 8 hours were found to be free of any cross-sectional and lengthwise distortion.

*Example 3*

Into 100 parts by weight of high density polyethylene (0.96 density), there were thoroughly milled 120 parts by weight of carbon black and about 2.5 parts by weight of 2,5-bis(tert-butylperoxy)-2,5-dimethylhexane. Some care was observed not to conduct this milling and dispersing operation at an excessively high speed so as to limit the temperature of the entire milling operation to a level below about 300° F. i.e. well below active decomposition temperature of the 2,5-bis(tert-butylperoxy)-2,5-dimethylhexane. The resulting finished composition was then charged to an extruder. The temperature of the body of the extruder and of the material therein was maintained at about 280° F. The aforementioned material was then formed and extruded on an aluminum wire. The resulting coated wire was then passed through a sizing ring located at the entrance of the curing bath and then into the bath containing as a heat transfer medium a molten mixture of the following salts by weight: 40% sodium nitrite, 7% sodium nitrate, and 53% potassium nitrate. At the time of the coated wire's entrance into the bath media it had an average specific gravity of about 1.91 i.e. about the same as that of the molten salt mixture at the curing temperature of about 425° F. The coated wire upon leaving the curing bath was cooled and continuously removed and stored on a wind up or take off reel.

The coated wire was examined and found to be thoroughly cured, yet smooth surfaced and form stable. Portions of the extrudate were placed in an oven heated to 200° F. and upon examination after 8 hours were found to be free of any cross-sectional and lengthwise distortion.

*Example 4*

Substantially the same procedure as in Example 1 was followed but the composition added to the extruder comprised a polymeric composition of about 100 parts by weight of low density polyethylene (0.92 density) and about 120 parts by weight of carbon black and about 2 parts by weight of dicumyl peroxide. The composition was extruded in the shape of a solid tubular rod having an O.D. of ½ inch and had a specific gravity of about 1.13 at the time the rod entered the curing bath. The heat transfer medium comprised a mixture of water, glycerin, and sodium chloride combined in such proportions that the specific gravity of the resulting heat transfer medium was 1.13 at 400° F.

Portions of the resulting cured rod were placed in an oven heated to 200° F. and upon examination after 8 hours were found to be free of any lengthwise and cross-sectional distortion.

In the above illustrative examples various modifications may be introduced without departing from the scope of my invention. For example the so processed polymeric compositions may include polyethylene, polypropylene, polybutene and other polyolefins and combinations thereof. Also, such copolymers of the diverse monomers from any of the above-mentioned polymers and copolymers of same with styrene, and/or its alpha substituted derivatives, butadiene, isoprene, and other such mono- and di-olefins may be included within the scope of my invention. The amount and type of filler in the aforementioned polymeric compositions may be varied and the most appropriate and convenient heat transfer medium selected accordingly. Also, various heat transfer media may be combined with other such compatible media in such proportions that they conform to the specifications of the particular extrudate being cured. For example, mercury or lead may be mixed in any proportion with the lower melting metals to produce a heat transfer liquid of the desired specific gravity. Also, salts may be added to the various heat transfer media in which they are compatible to obtain the desired specifications. Also, various compatible organic fluids may be mixed together in varying proportions to obtain a heat transfer medium of the desired specifications.

Having disclosed my invention what I claim as new and desire to obtain by U.S. Letters Patent is:

1. A process of continuously producing a thoroughly cured yet smooth surfaced, distortion free, form stable plastic article from a polymeric composition which must be cured at a temperature above the no-strength or melting point thereof, comprising extruding said polymeric composition through a passage of the approximate cross-sectional shape desired in the finished article and then conducting the extruded composition continuously through a liquid heat transfer medium heated to the temperature needed for high speed curing of said composition, said liquid heat transfer medium having the following properties: (1) the specific gravity of the liquid heat transfer medium at the curing temperature is substantially equal to the specific gravity of the extruded polymeric composition at the time said extrudate enters the bath, (2) the liquid heat transfer medium is substantially inert toward the extrudate at the time the extrudate enters the bath, (3) the atmospheric boiling temperature of the heat transfer medium is above the curing temperature required.

2. The process of claim 1 in which the final plastic article comprises the cured polymeric composition covering an internal support.

3. The process of claim 1 where the final plastic article is hollow.

4. The process of claim 1 wherein the said polymeric composition comprises a polymer formed from α-monoolefinic hydrocarbon monomers.

References Cited in the file of this patent

UNITED STATES PATENTS

| | | |
|---|---|---|
| 2,125,001 | Cowen et al. | July 26, 1938 |
| 2,139,414 | Lee | Dec. 6, 1938 |
| 2,451,986 | Slaughter | Oct. 19, 1948 |
| 2,897,547 | Weingand | Aug. 4, 1959 |
| 2,971,221 | Schoenbeck | Feb. 14, 1961 |

FOREIGN PATENTS

| | | |
|---|---|---|
| 541,566 | Great Britain | Dec. 2, 1941 |